US012168895B2

(12) United States Patent
Savant et al.

(10) Patent No.: US 12,168,895 B2
(45) Date of Patent: Dec. 17, 2024

(54) ELECTRONIC VEHICLE HANDLE ASSEMBLY INCLUDING A MECHANICAL SWITCH FOR A SCISSORS DOOR

(71) Applicant: MINEBEA ACCESSSOLUTIONS ITALIA S.P.A., Pianezza (IT)

(72) Inventors: Marco Savant, Pianezza (IT); Anthony Guerin, Pianezza (IT)

(73) Assignee: MINEBEA ACCESSSOLUTIONS ITALIA S.P.A., Pianezza (IT)

( * ) Notice: Subject to any disclaimer, the term of this patent is extended or adjusted under 35 U.S.C. 154(b) by 20 days.

(21) Appl. No.: 17/704,321

(22) Filed: Mar. 25, 2022

(65) Prior Publication Data

US 2022/0307296 A1 Sep. 29, 2022

(30) Foreign Application Priority Data

Mar. 26, 2021 (EP) .................................... 21165329

(51) Int. Cl.
*E05B 79/06* (2014.01)
*E05B 81/42* (2014.01)
(Continued)

(52) U.S. Cl.
CPC .............. *E05B 81/78* (2013.01); *E05B 79/06* (2013.01); *E05B 81/42* (2013.01); *E05B 83/36* (2013.01); *E05B 85/18* (2013.01)

(58) Field of Classification Search
CPC .......... E05B 81/78; E05B 79/06; E05B 81/42; E05B 83/36; E05B 85/18; E05B 81/76;
(Continued)

(56) References Cited

U.S. PATENT DOCUMENTS 4,074,545 A * 2/1978 Case ........................ D06F 37/42 192/136
5,048,881 A * 9/1991 Renfro ................... H02B 1/063 292/322

(Continued)

FOREIGN PATENT DOCUMENTS

DE 20 2019 102 809 U1 7/2019
EP 1 081 319 A1 8/2000

(Continued)

*Primary Examiner* — Michael P Ferguson
*Assistant Examiner* — Thomas L Neubauer
(74) *Attorney, Agent, or Firm* — Oblon, McClelland, Maier & Neustadt, L.L.P.

(57) ABSTRACT

The invention is directed to a vehicle door handle assembly (10) comprising:

- a rotatable flap (20), said flap (20) extending along and configured to rotate about a rotation axis (Y),
- a mechanical actuation switch (28) generating an electrical signal to be sent to a vehicle door controller to release the vehicle door, rotation of the rotatable flap (20) causing the activation of said mechanical actuation switch (28), and
- a locking mechanism generating an electrical signal to be sent to a vehicle door controller to lock the vehicle door comprising a lock switch button, The handle assembly (10) comprises an elongated base plate (14) made of one piece extending along the rotation axis (Y) of the flap (20). The flap (20) is hinged on the base plate (14). The base plate (14) encases the mechanical actuation switch (28) and the lock switch button (48). The mechanical actuation switch (28) and the lock switch button (48) are disposed on either side of the flap (20).

13 Claims, 9 Drawing Sheets

(51) Int. Cl.
*E05B 81/78* (2014.01)
*E05B 83/36* (2014.01)
*E05B 85/18* (2014.01)

(58) Field of Classification Search
CPC .......... E05B 85/10; E05B 77/34; E05B 79/22; E05B 81/04
See application file for complete search history.

(56) References Cited

U.S. PATENT DOCUMENTS

| | | | | |
|---|---|---|---|---|
| 5,560,659 | A * | 10/1996 | Dault | E05B 85/18 292/336.3 |
| 7,102,486 | B2 * | 9/2006 | Yamagishi | G07C 9/00571 340/541 |
| 7,108,301 | B2 * | 9/2006 | Louvel | E05B 79/06 292/201 |
| 9,518,410 | B2 * | 12/2016 | Vasi | E05B 81/08 |
| 9,617,764 | B2 * | 4/2017 | Vasi | E05B 85/103 |
| 10,253,533 | B1 * | 4/2019 | Pudney | E05F 1/1016 |
| 10,711,494 | B2 * | 7/2020 | Bingle | E05B 81/06 |
| 11,396,764 | B2 * | 7/2022 | Blount | E05B 81/76 |
| 11,649,659 | B2 * | 5/2023 | Chen | E05B 85/103 292/336.3 |
| 2015/0315812 | A1 * | 11/2015 | Vasi | E05B 81/08 292/336.3 |
| 2019/0078360 | A1 * | 3/2019 | Blount | E05B 85/103 |
| 2019/0234121 | A1 * | 8/2019 | Pudney | E05B 85/103 |
| 2020/0173627 | A1 | 6/2020 | Fukui et al. | |

FOREIGN PATENT DOCUMENTS

| | | | |
|---|---|---|---|
| FR | 2 753 739 | A1 | 3/1998 |
| WO | 2020/020632 | A1 | 1/2020 |

* cited by examiner

ELECTRONIC VEHICLE HANDLE ASSEMBLY INCLUDING A MECHANICAL SWITCH FOR A SCISSORS DOOR

TECHNICAL FIELD OF THE INVENTION

The invention relates to a door opening assembly to control the opening of a vehicle door, in particular in the case of automated door latches that are controlled via electric means without mechanically actuated door handle lever or knob.

Automated door latches selectively lock or release vehicle door panels in an automated fashion. By automated door latches are herein designated door latches where the user does not provide the energy to actuate the latch through grasping and moving a handle lever, knob or other.

Once the door panel is released, the user or an electric panel actuator swings or slides the panel to grant physical access the vehicle. Automated door latches, under normal circumstances, do not require bulging handle levers on the exterior surface of the vehicle. The air drag of the vehicle can consequently be reduced, while the visual aspect of the vehicle can be streamlined.

Most automated door latches comprise an electric actuator that sets a bolt, hook or lever in motion upon reception of an actuation signal so as to release the vehicle door. Such an electric actuator can be activated using an electrical or a mechanical switch. The electrical switch has the advantage, compared to a mechanical switch, of saving space in the door assembly as it there is no need to provide room required by the stroke of a mechanical part to be displaced. However, unlike a mechanical switch, it is costly and complexifies the electronics of the door assembly.

Moreover, for certain type of doors, in particular scissors doors, or so-called "Lambo" or "beetle-wing" doors, the door handle is usually oriented in such a way that the activation switch or flap rotates about an axis that is parallel to the rotation axis of the door, i.e. along the longitudinal, i.e. rolling or Y-axis of the vehicle. In particular, the available space to house the vehicle door handle assembly is particularly limited along the other directions than the longitudinal directions. There is therefore a need to provide a vehicle door handle assembly that is adapted to these constraints.

SUMMARY OF THE INVENTION

The purpose of the invention is therefore to provide an automated vehicle door handle assembly that involves less manufacturing costs and less space for activation, and can be inserted in a constrained space, in particular that is mostly limited to a single direction.

To that end, the invention concerns a vehicle door handle assembly comprising:

- a rotatable flap, said flap extending along and configured to rotate about a rotation axis between a rest position and a door opening position,
- a mechanical actuation switch generating an electrical signal to be sent to a vehicle door controller to release the vehicle door, rotation of the rotatable flap causing the activation of said mechanical actuation switch, and
- a lock switch button configured to lock or unlock the vehicle door, characterized in that it also comprises an elongated base plate made of one piece extending along the rotation axis of the rotatable flap, the rotatable flap being hinged on the base plate, the base plate encasing the mechanical actuation switch and the lock switch button, the mechanical actuation switch and the lock switch button being disposed on either side of the rotatable flap.

Owing to the fact that a single base plate made of one extending along a single direction encases the flap, the actuation switch and the lock switch button which are disposed on either side of the flap, it possible to provide a vehicle door handle assembly that may be fitted in a space that extends mostly along a single direction.

The vehicle door handle assembly may present one or several of the below described aspects taken alone or in combination.

According to one embodiment, the base plate for example comprises a recess in which the flap is housed and a lock opening in which the lock switch button is housed.

According to one embodiment, the door handle assembly for example also comprises bowl-shaped element and a housing, the bowl-shaped element and the base plate being inserted into the housing.

According to one embodiment, the bowl-shaped element for example comprises a U-shaped reception surface, and the base plate faces the U-shaped reception surface.

According to one embodiment, the base plate for example comprises assembly tabs located on each side of the base plate configured to engage with corresponding support rails of the housing.

According to one embodiment, the door handle assembly for example also comprises a door handle support configured to be fastened to a rear side of the vehicle door, the housing being fastened to a rear side of the door handle support.

According to one embodiment, the base plate for example comprises a watertight gasket around its contour, preferably overmolded over the base plate. This prevents any water from entering the door handle assembly.

More particularly, the watertight gasket for example comprises a first section surrounding the recess and a second section covering a portion of the base plate in which the lock opening is made, surrounding lock opening.

According to another embodiment, the rotatable flap is in particular sensibly planar and is delimited, on the one hand, by two parallel rectilinear longitudinal sides extending along the rotation axis and, on the hand, by two parallel rectilinear lateral sides extending along a direction that is sensibly perpendicular to the rotation axis. A flap of such as shape takes very little space and is both easy to manufacture and manipulate for a user.

According to one embodiment, the door handle assembly also comprises a cam holder and a cam supported by the cam holder, said cam holder being connected to the flap such that the cam holder is rotatable about the rotation axis and that rotation of the flap causes rotation of the cam holder, rotation of the cam holder causing the cam to activate said mechanical actuation switch.

Owing to the fact that the assembly comprises a cam holder connected to the flap such that the cam holder is rotatable about the rotation axis and that rotation of the flap causes rotation of the cam holder and activation of said switch, activation of the switch can be obtained even if very little space is available for the flap to rotate, i.e. little stroke space is available. Such an arrangement indeed only requires space along the rotation axis and not along the flap stroke direction.

According to one embodiment, the cam holder comprises for example a cam lever extending along a longitudinal direction, said lever comprising a first end hinged on the rotation axis of the flap and a second end, opposite to the first, supporting the cam. This particular configuration allows to take advantage on the lever constructions and transform a very small pivoting movement of the flap into sufficient movement of the cam to activate the switch.

In order to further limit the space taken by the handle assembly, the axis about which the cam holder is rotatable comprises for example a pin stemming from the first end of the cam lever configured to be inserted into a hole opened in the flap along the rotation axis, such that the cam lever is substantially parallel to a lateral side of the flap.

In order to yet further limit the space taken by the handle assembly, the length of the cam lever is in particular at least the same as the length of a lateral side of the flap.

According to a further aspect, the mechanical actuation switch comprises for instance a flexible blade and wherein during rotation of the cam holder, a contact surface of the cam comes into contact with and pushes the flexible blade in at least one direction that is transverse to the rotation axis.

According to another aspect, the flexible blade may be oriented perpendicular to the rotation axis of the flap. This particular configuration also allows to transform a very small movement of the flap into sufficient movement to activate the switch.

According to another aspect, the mechanical actuation switch comprises for example a push button and wherein during rotation of the cam holder, the flexible blade comes into contact with and pushes the push button, said pushing of the push button generating an electrical signal to be sent to a vehicle door controller to release the vehicle door.

Furthermore, the contact surface of the cam may present a slope joining two sensibly rectilinear surfaces. Thanks to this configuration, the gradient of the slope determines the stroke speed to push the push button.

In order for the handle to be pleasant to the touch for the user but resistant enough, the rotatable flap comprises for example a section made of elastomer, such as rubber, overmolded on a section made of hard plastic, for example polypropylene.

BRIEF DESCRIPTION OF THE DRAWINGS

The invention will be better understood in view of the following description, referring to the annexed Figures in which.

DETAILED DESCRIPTION OF THE DRAWINGS

Figure 1:
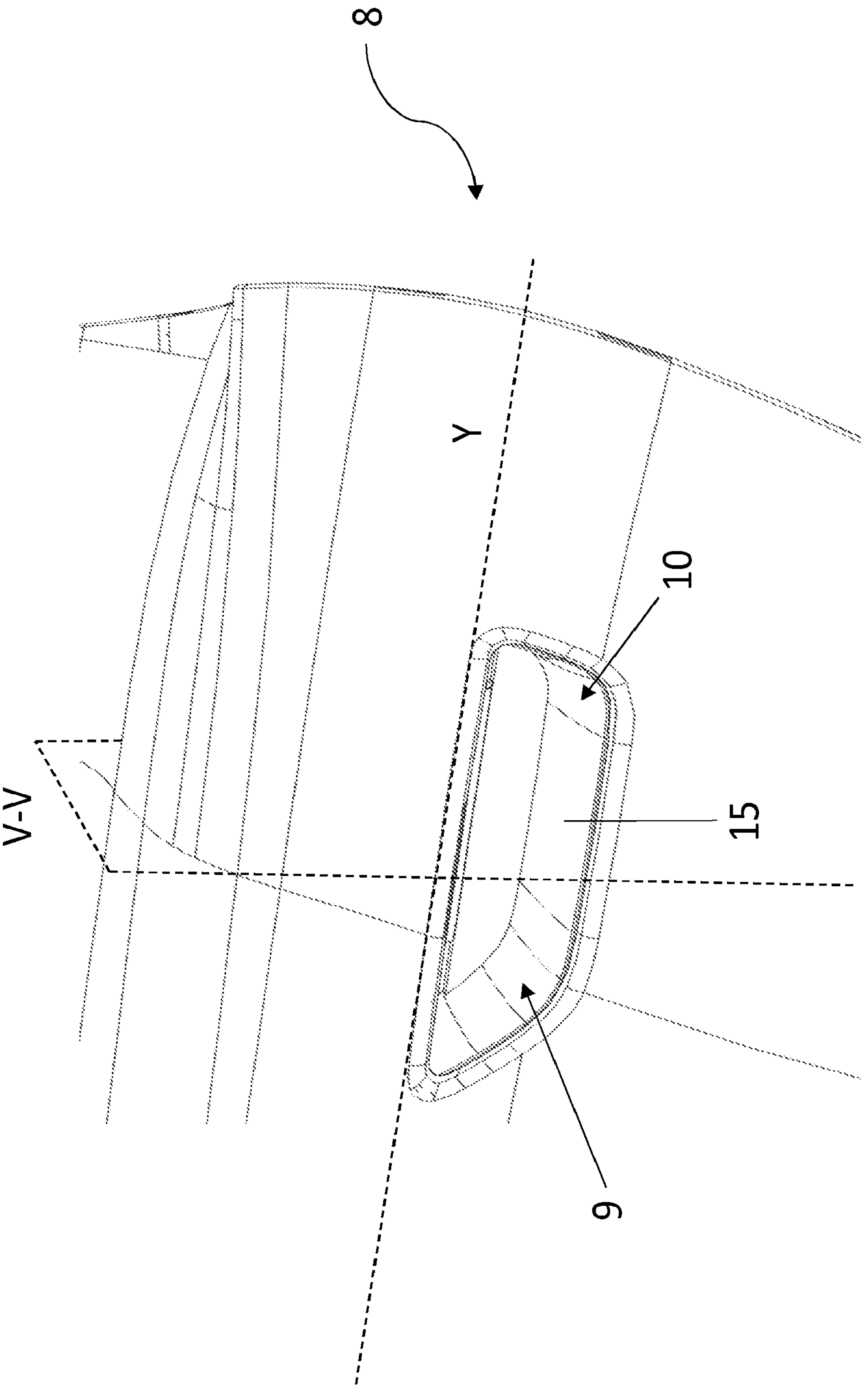
FIG. 1 is a view in perspective of a vehicle door including a handle door assembly according to a particular embodiment of the invention.
Figure 2:
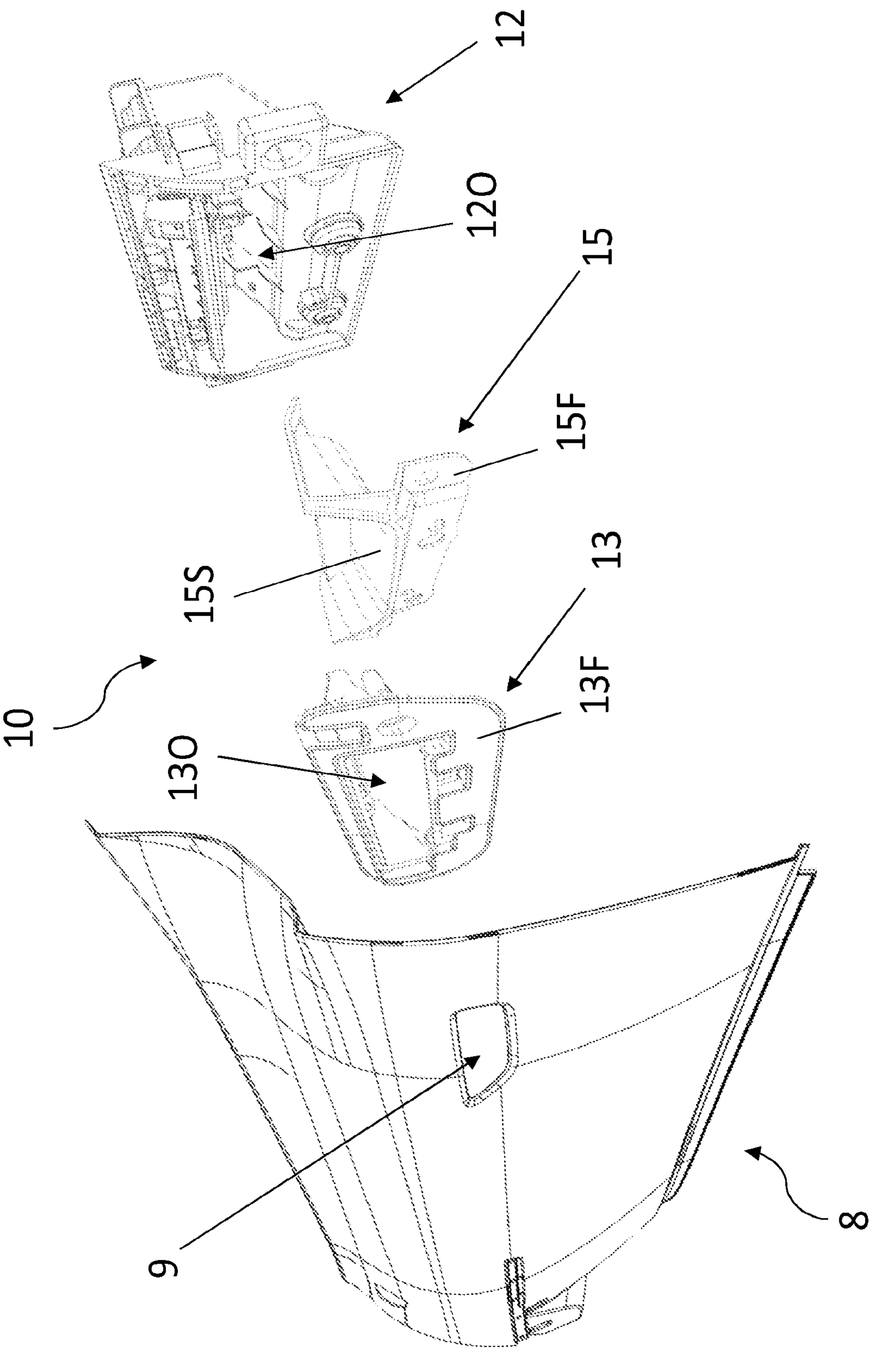
FIG. 2 is an exploded view of the vehicle door and handle door assembly of FIG. 1.
Figure 3:
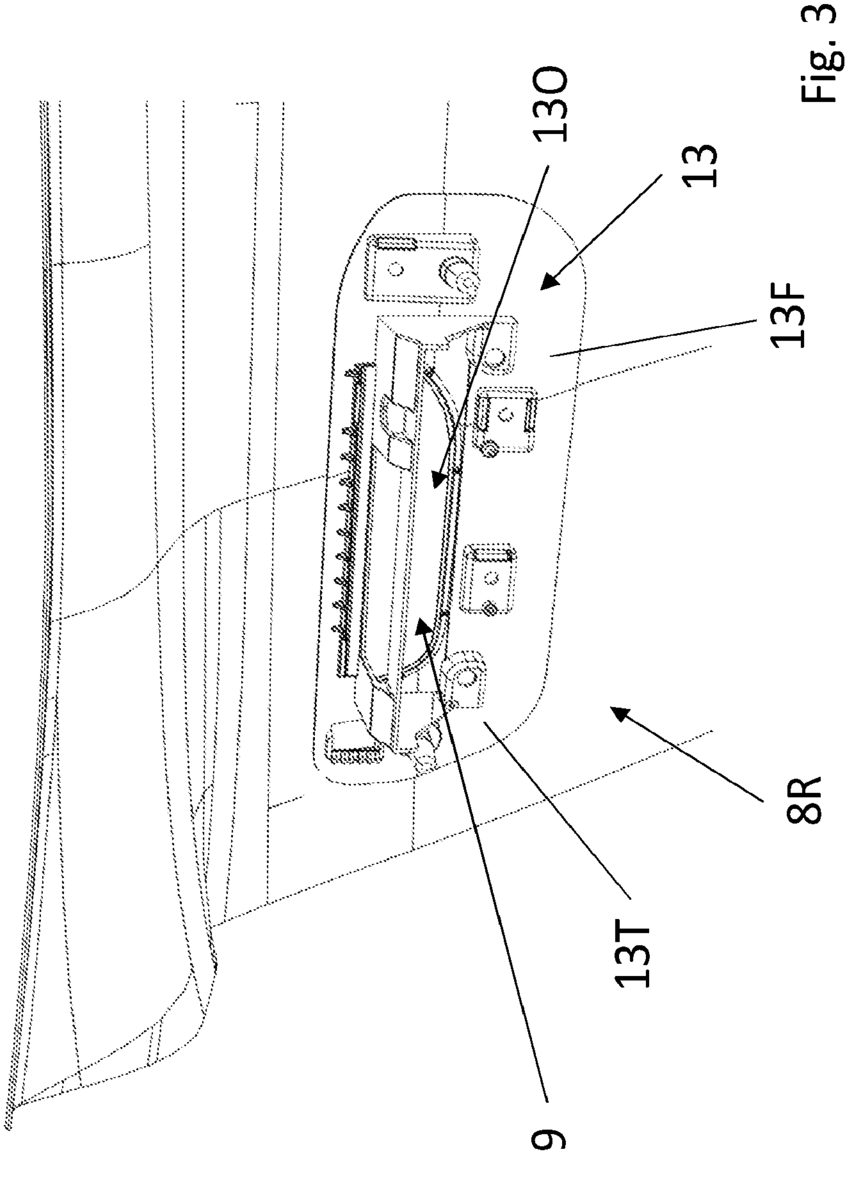
FIG. 3 is a view in perspective of the rear side of the vehicle door of FIG. 1 without the door handle assembly housing.

A vehicle door 8 including a vehicle door handle assembly 10 according a particular embodiment of the invention has been shown on FIGS. 1 to 3.

Vehicle door 8 in particular is a scissors door, or so-called “Lambo” or “beetle-wing” door. Hence, the rotation axis of the door is the longitudinal, i.e. rolling or Y-axis of the vehicle.

Vehicle door 8 comprises an opening 9 in which the door handle assembly 10 is inserted from the rear side 8R of the vehicle door 8, i.e. the inner side of the vehicle once the door is assembled.

The door handle assembly 10 includes, as can be seen on FIG. 2, a housing 12, a door handle support 13, a base plate 14 and a handle bowl 15.

As can be best seen on FIG. 3, door handle support 13 comprises a flat flange 13F, the front surface of which rests against and is connected to the rear side 8R of the vehicle door 8, comprising a central opening 13O configured to receive the bowl-shaped reception surface 15. In this particular embodiment, front surface of flat flange 13F is glued to rear side 8R of the vehicle door. More particularly, central opening 13O has a sensibly rectangular contour, the dimensions of which are adapted to the dimensions and shape of the reception surface 15.

Door handle support 13 also includes a top wall 13T, which extends perpendicularly from the flat front wall 13F towards the inner side of the vehicle once the vehicle door handle assembly 10 is mounted on the vehicle door 8. This top wall 13T delimits, along with bowl-shaped reception surface 15, a volume V which is connected to door opening 9, in which the user inserts their hand when actuating the handle.

Figure 6:
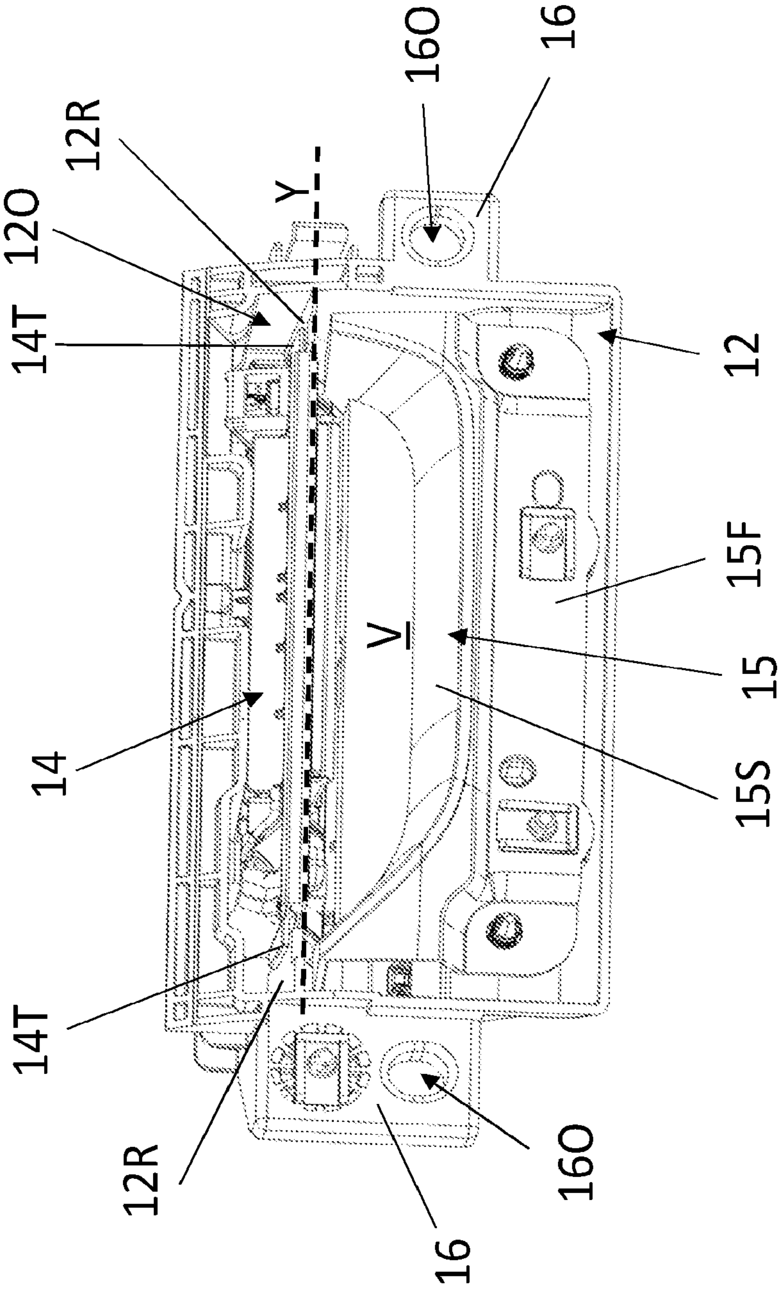
FIG. 6 is a view in perspective of the vehicle door handle door assembly of FIG. 1.

As can be seen on FIGS. 2 and 6, handle bowl 15 includes a flat flange 15F that rests against the rear side of the handle support flange 13F door handle support 13, and a U-shaped reception surface 15S.

Figure 4:
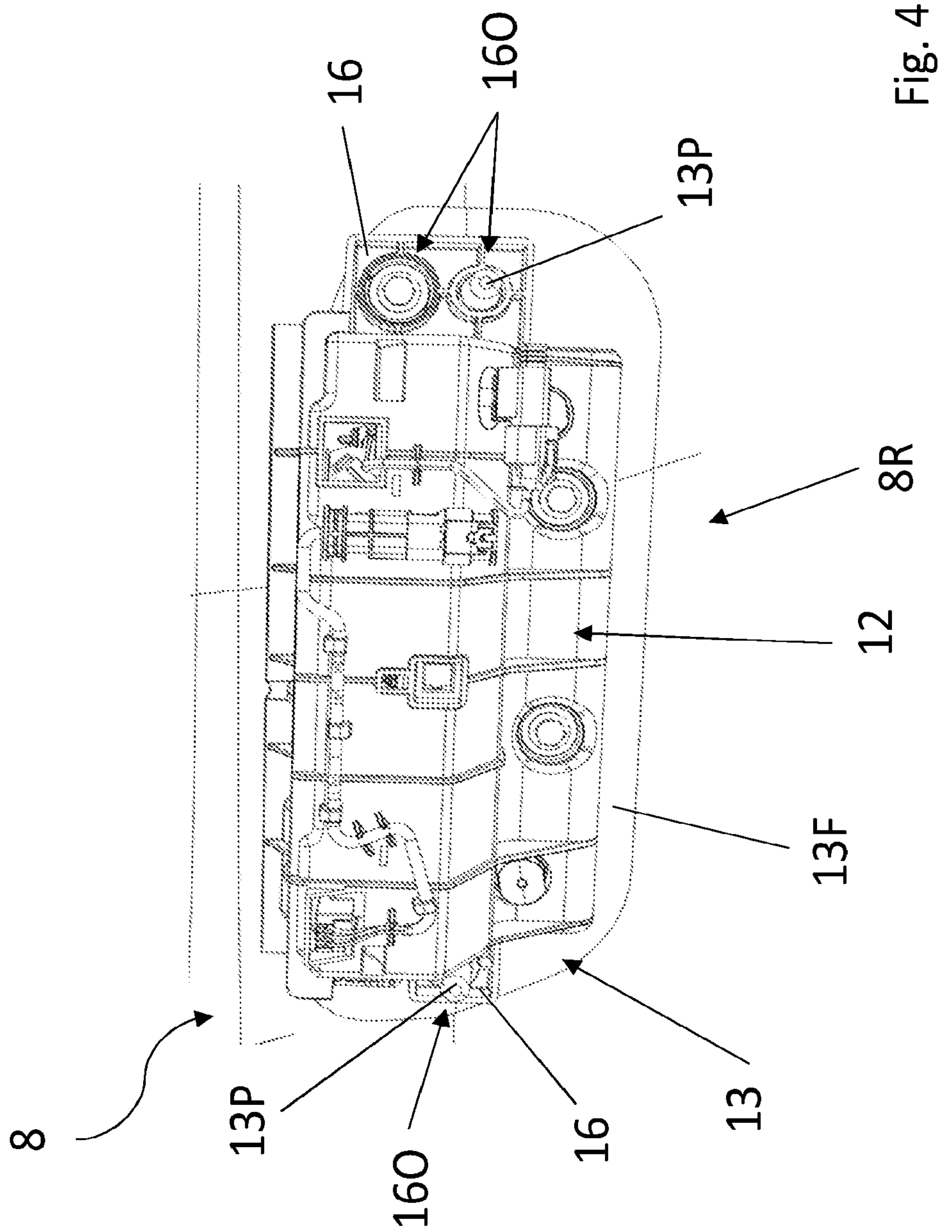
FIG. 4 is a view in perspective of the rear side of the vehicle door of FIG. 1.

As can be seen on FIGS. 2, 4 and 6, handle bowl 15 and base plate 14 are inserted into housing 12. To that end, in this particular embodiment, housing 12 includes a main opening 12O intended to house both handle bowl 15 and the base plate 14.

Housing 12 also comprises two tabs 16, located on each side of main opening 12O, including openings 16O to insert pins 13P extending from handle support flange 13F to connect housing 12 to door handle support 13 and thus connect housing 12 to vehicle door 8.

As can be seen on FIG. 6, housing 12 also comprises two support rails 12R intended to engage two assembly tabs 14T located on each side of the base plate 14. Base plate 14 is made of once piece, for example out of plastic. Preferably, for ease of manufacturing, base plate 14 is moulded in one piece.

Figure 7:
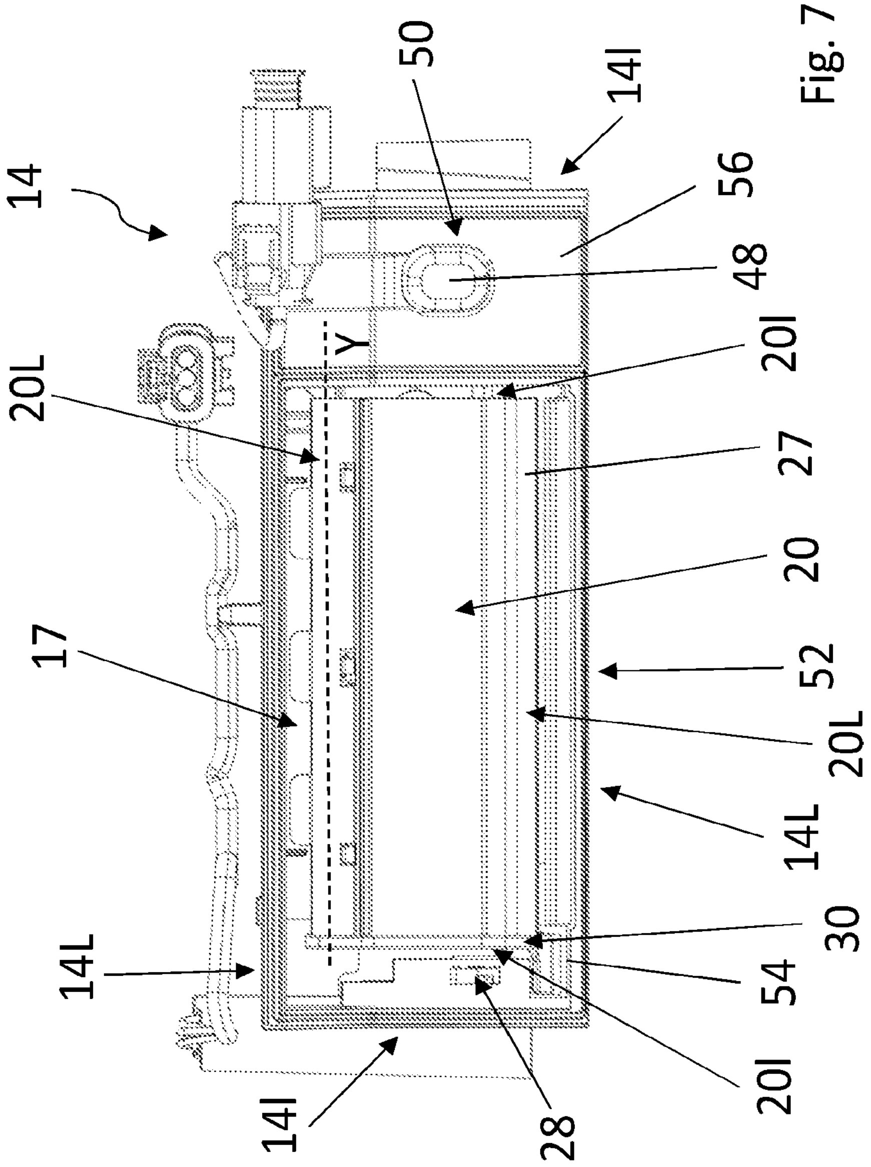
FIG. 7 is a front view of the door handle base plate of the handle door assembly of FIG. 1.
Figure 8:
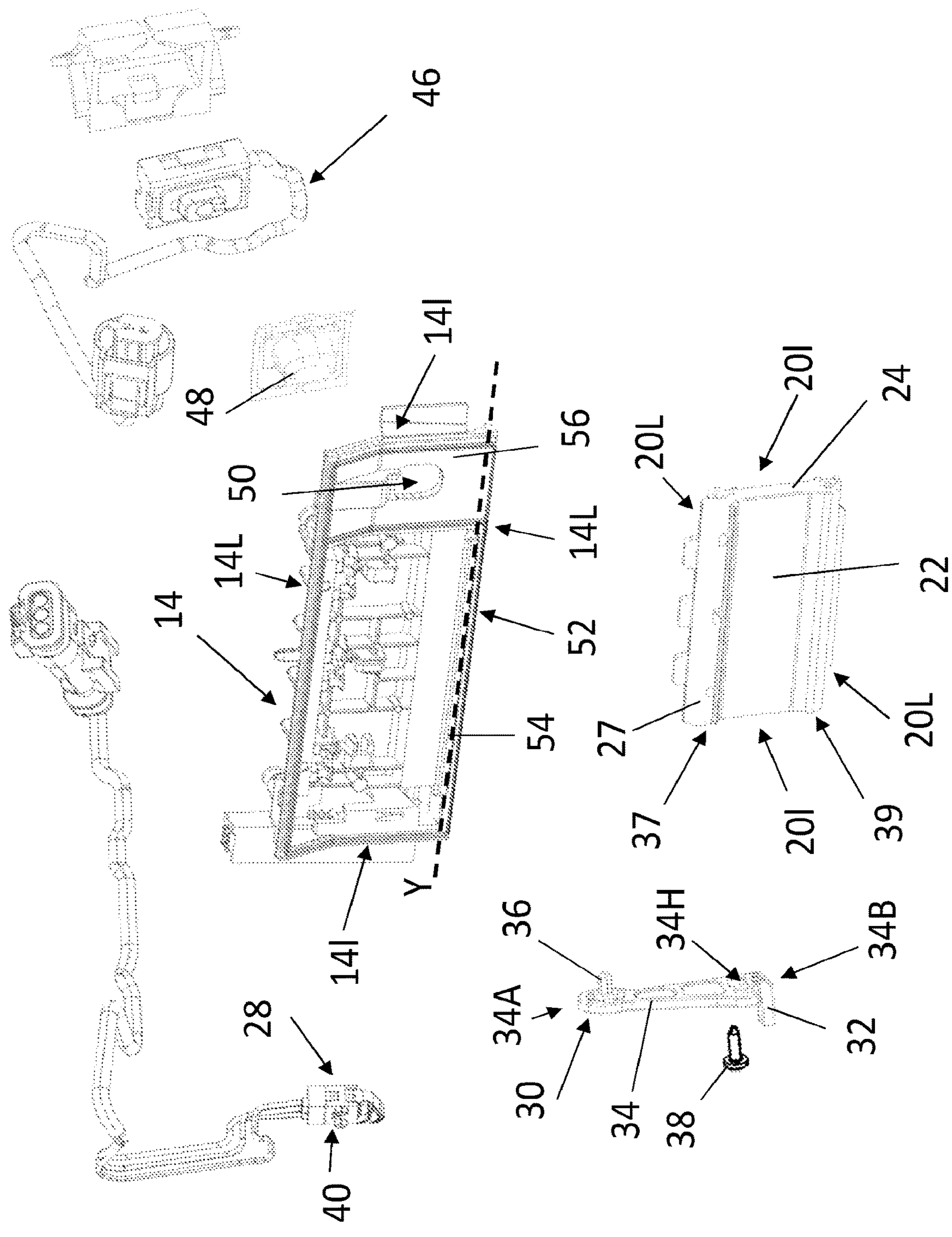
FIG. 8 is an exploded view of the base plate of FIG. 4.

As can be seen on FIGS. 6 to 8, the base plate 14 faces the U-shaped reception surface 15S. To that end, in this particular example, base plate 14 is inserted in the top section of main opening 12O such that it extends along a plane that is locally substantially perpendicular to vehicle door 8. More particularly, the base plate 14 is located in the top section of volume V, proximate top wall 13T of the wall support.

Base plate 14 extends along axis Y (the longer side of the rectangle extends along axis Y).

More particularly, base plate 14 is delimited, on the one hand, by two parallel rectilinear longitudinal sides 14L extending along axis Y and, on the hand, by two parallel rectilinear lateral sides 14I extending along a direction that is sensibly perpendicular to the rotation axis Y.

Base plate 14 includes a recess 17 housing a rotatable flap 20. Recess 17 has a substantially rectangular contour, which is adapted to the shape of a rotatable flap 20 which has a substantially rectangular in shape.

As can be seen best on FIG. 7, rotatable flap 20 is configured to rotate about axis Y, which corresponds to the direction along which base plate 14 extends. To be more precise, rotatable flap 20 is configured to rotate about rotation axis Y between a rest position, which corresponds to the position shown on the Figures, and a door opening position (not shown).

The rotatable flap 20 is hinged on the base plate 14. Here, rotatable flap 20 rotates about one of the longitudinal sides 14L of base plate 14. The hinge of rotatable flap (not visible on the Figures) is housed within recess 17.

Rotatable flap 20 is sensibly planar and is delimited, on the one hand, by two parallel rectilinear longitudinal sides 20L extending along the rotation axis and, on the hand, by two parallel rectilinear lateral sides 20I extending along a direction that is sensibly perpendicular to the rotation axis Y.

Figure 5:
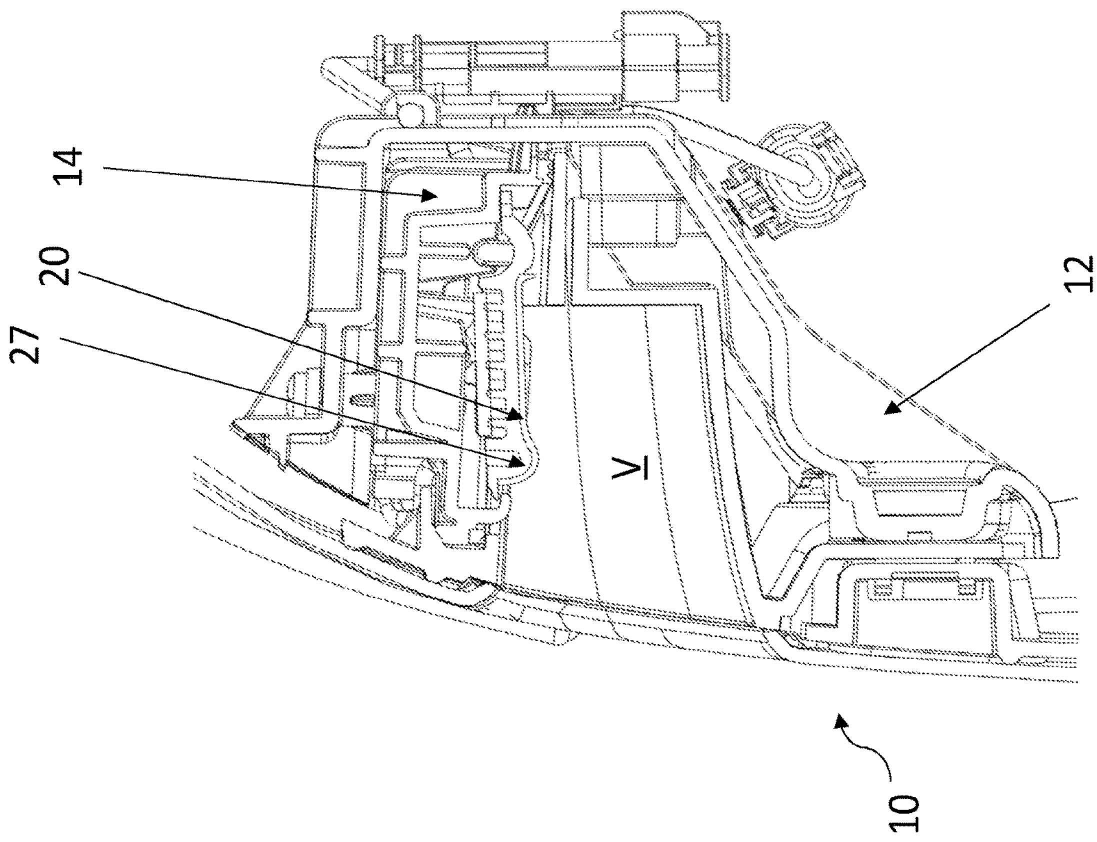
FIG. 5 is a cut view along plane V-V of FIG. 1.

As can be seen on FIG. 5, base plate 14 is also inserted in main opening 12O such that the door opening 9 gives access to rotatable flap 20: The hand of the handle user can be inserted inside volume V through door opening 9 and to actuate rotatable flap 20. To be more precise, the hand is inserted fingers first inside volume V and moves upwards to come into contact with rotatable flap 20.

Turning now to FIGS. 7 and 8, rotatable flap 20 comprises a first section 22 made of elastomer, such as rubber, overmolded on a second section 24 made of hard plastic, for example polypropylene. First section 22 is placed facing volume V so that a hand that is inserted into volume V first comes in contact with a surface that is pleasant to the touch.

Preferably, rotatable flap 20 comprises at its longitudinal side 20L that is closest to the door opening 19, a boss 27, that extends preferably along the whole longitudinal side 20L. This boss 27 allows the user to easily feel and push onto the rotatable flap 20 as soon as their hand is inserted into volume V.

As can be seen on FIGS. 7 and 8, rotation of the rotatable flap 20 activates a mechanical actuation switch 28, generating an electrical signal to be sent to a vehicle door controller (not shown) to release the vehicle door.

Base plate 14 encases mechanical actuation switch 28. In the particular embodiment as shown on the Figures, mechanical actuation switch 28 is housed within recess 17 of the base plate 14, proximate one of the lateral sides 14I of the base plate 14.

In order to activate mechanical actuation switch 28, handle assembly 10 also comprises a cam holder 30 and a cam 32 supported by the cam holder 30. Cam holder 30 is connected to the flap 20 such that it is rotatable about the rotation axis Y.

Cam holder 30 is also housed within base plate 14. In the particular embodiment as shown on the Figures, cam holder 30 is housed within recess 17 of the base plate 14, proximate one of the lateral sides 14I of the base plate 14. Preferably, cam holder 30 is placed next to mechanical actuation switch 28, i.e. on the same lateral side 14I of the base plate 14.

In the present embodiment, the cam holder 30 comprises a cam lever 34 extending along a longitudinal direction, said lever comprising a first end 34A hinged on the rotation axis Y of the flap 20 and a second end 34B, opposite to the first, supporting the cam 32.

More specifically, the axis around which the cam holder 30 is rotatable is formed by a pin 36 stemming from the first end 34A of the cam lever inserted into a hole 37 opened in the flap 20 along the rotation axis Y so that the cam lever 34 is substantially parallel to a lateral side 20I of the flap 20. A second pin 38 inserted in a hole 34H of the cam lever 34 located next to the second end 34B of the cam lever 34 is also inserted in a second hole 39 of the flap 20, located opposite the first hole 37 along the lateral side 20I of the flap.

Here, as can be seen on FIGS. 3 and 4, the length of the cam lever 34 is at least the same as the length of a lateral side 20I of the flap, here sensibly the same length.

Handle assembly 10 is configured so that that rotation of the flap 20 causes rotation of the cam holder 30, rotation of the cam holder 30 causing the cam 32 to activate mechanical actuation switch 28.

More specifically, mechanical actuation switch 28 comprises a flexible blade 40 such that during rotation of the cam holder 30, a contact surface 32S of the cam 32 comes into contact with and pushes the blade 40 in at least one direction that is transverse to the rotation axis Y. Here, the blade 40 extends along a longitudinal axis which is sensibly perpendicular to the rotation axis Y of the flap. One end 41 of the blade 40 is recurved.

Figure 9:
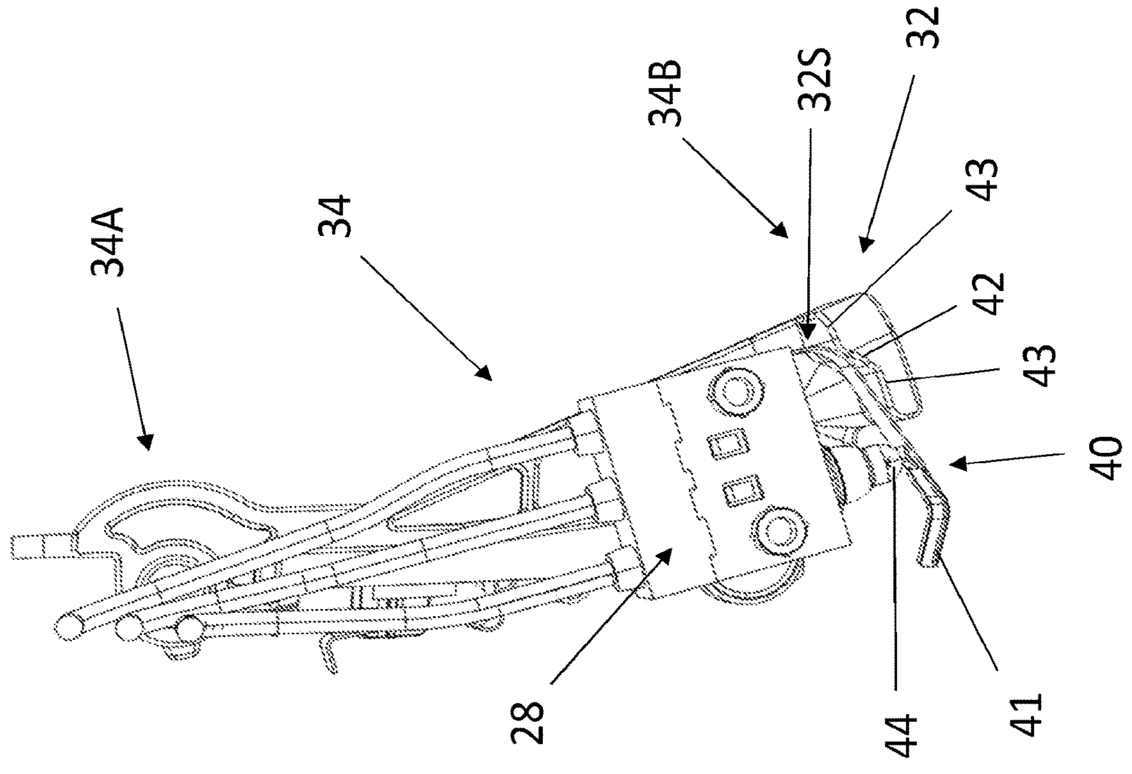
FIG. 9 is a side view of a mechanical switch, a cam lever and a flap of the vehicle door handle door assembly of FIG. 1.

As can be better seen on FIG. 9, the contact surface 32S of the cam 32 is formed of a slope 42 joining two sensibly rectilinear surfaces 43. Thanks to this configuration, the gradient of the slope 42 determines the stroke speed to push the push button 44.

The blade 40 first comes into contact with the first rectilinear surface 43, which does not actuate the switch 28 yet. Activation of the switch 28 becomes possible when the blade 40 comes into contact with the slope 42, which corresponds to the point when the blade 40 also comes into contact with a push button 44 placed opposite blade 40. Hence, during rotation of the cam holder 30, blade 40 comes into contact with and pushes the push button 44. Pushing of the push button 44 generates an electrical signal to be sent to the vehicle door controller to release the vehicle door.

Vehicle door assembly 10 also comprises a lock switch button 48 configured lock or unlock the vehicle door 9. For example, the activation of the lock switch button 48 generates an electrical signal to be sent to a vehicle door controller (not shown) to unlock or lock one or more doors the vehicle. Lock switch button 48 is accessible from volume V.

Base plate 14 encases lock switch button 48. More particularly, as can be seen on FIGS. 7 and 8, base plate 14 comprises a lock opening 50 in which the lock switch button 48 is housed. Lock opening 50 is a through opening adapted to the shape of lock switch button 48. Here, lock switch button 48 having a circular transverse section, lock opening 50 is circular in shape. Naturally, other shapes may be considered.

Mechanical actuation switch 28 and lock switch button 48 are disposed on either side of the rotatable flap 20.

Hence, in this particular embodiment, lock opening 50 is located proximate one of the lateral sides 14I of the base plate 14, here the lateral side 14I that is opposite the one proximate to the mechanical actuation switch 28.

In order to prevent any water from entering base plate 14 and damaging mechanical actuation switch 28 or a locking mechanism 46, base plate 14 also includes watertight gasket 52 around its contour, preferably overmolded over the base plate 14. Hence, in the particular embodiment shown on the Figures, gasket 52 has a rectangular contour.

To ensure a better sealing, watertight gasket 52 surrounds both recess 17 and lock opening 50. More particularly, gasket 52 comprises a hollow first section 54 surrounding recess 17, and a full second section 56 which covers the portion of the base plate 14 in which the lock opening 50 is made, surrounding lock opening 50.

Thus one clearly understands that thanks to the fact that the single piece, that is base plate 14, extending along a single direction houses the flap 20, the mechanical actuation switch 28 and the lock switch button 48, it possible to provide a vehicle door handle assembly 10 that may be fitted in a space that extends mostly along a single direction, here the Y direction.

It is therefore possible provide an automated vehicle door handle assembly 10 that involves less manufacturing costs and less space for activation, and can be inserted in a constrained space, in particular that is mostly limited to a single direction, here the Y direction.

LIST OF REFERENCES

8: Vehicle door
8R: Rear side of the vehicle door
9: Door opening
10: Door handle assembly
12: Door handle housing
12O: Housing opening
12R: Housing rails
13: Door handle support
13F: Flange of the door handle support
13O: Central opening of the door handle support
13P: Door handle support pins
13T: Top wall of the door handle support
14: Base plate
14L: Longitudinal side of the base plate
14I: Lateral side of the base plate
14T: Assembly tabs
15: Handle bowl
15F: Bowl flange
15S: U-shaped reception surface
16: Housing tabs
16O: Housing opening
17: Recess of the base plate
20: Rotatable flap
20L: Longitudinal side of the flap
20I: Lateral side of the flap
22: First section of the flap
24: Second section of the flap
27: Flap boss
28: Mechanical actuation switch
30: Cam holder
32: Cam
32S: Contact surface of the cam
34: Cam lever
34A: First end of the cam lever
34B: Second end of the cam lever
34H: Hole of the cam holder
36: First pin
37: Flap hole
38: Second pin
39: Second flap hole
40: Flexible blade
42: Slope of the cam
43: Rectilinear surface
44: Switch push button
46: Locking mechanism
48: Lock switch button
50: Lock opening
52: Gasket
54: First hollow section of the gasket
56: Second full section of the gasket
V: Volume delimited by the reception surface
Y: rotation axis of the flap

The invention claimed is:

1. A vehicle door handle assembly comprising:

a rotatable flap, said flap extending along and configured to rotate about a rotation axis between a rest position and a door opening position, a mechanical actuation switch generating an electrical signal to be sent to a vehicle door controller to release the vehicle door, rotation of the rotatable flap causing the activation of said mechanical actuation switch, a lock switch button configured to lock or unlock the vehicle door, and an elongated base plate made of one piece extending along the rotation axis of the rotatable flap, the rotatable flap being hinged on the base plate, the base plate encasing the mechanical actuation switch and the lock switch button, the mechanical actuation switch and the lock switch button being disposed on either side of the rotatable flap, wherein the base plate comprises a recess, proximate a first lateral side of the base plate, in which the mechanical actuation switch and the flap are housed, and a lock opening in which the lock switch button is housed, said lock opening being located proximate a second lateral side of the base plate that is opposite the first lateral side in a direction extending along the rotation axis.

2. The door handle assembly according to claim 1, further comprising bowl-shaped element and a housing, the bowl-shaped element and the base plate being inserted into the housing.

3. The vehicle door handle assembly according to claim 2, wherein the bowl-shaped element comprises a U-shaped reception surface and the base plate faces the U-shaped reception surface.

4. The vehicle door handle assembly according to claim 1, wherein the base plate comprises assembly tabs located on each side of the base plate configured to engage with corresponding support rails of the housing.

5. The vehicle door handle assembly according to claim 1, further comprising a door handle support configured to be fastened to a rear side of the vehicle door, the housing being fastened to a rear side of the door handle support.

6. The vehicle door handle assembly according to claim 1, wherein the base plate comprises a watertight gasket around a contour of the base plate, the watertight gasket being overmolded over the base plate.

7. The vehicle door handle assembly according to claim 6, wherein the watertight gasket comprises a first section surrounding the recess and a second section covering a portion of the base plate in which the lock opening is made, surrounding lock opening.

8. The vehicle door handle assembly according to claim 1, wherein the rotatable flap is sensibly planar and is delimited, by two parallel rectilinear longitudinal sides extending along the rotation axis and by two parallel rectilinear lateral sides extending along a direction that is sensibly perpendicular to the rotation axis.

9. The vehicle door handle assembly according to claim 1, further comprising a cam holder and a cam supported by the cam holder, said cam holder being connected to the flap such that the cam holder is rotatable about the rotation axis and that rotation of the flap causes rotation of the cam holder, rotation of the cam holder causing the cam to activate said mechanical actuation switch.

10. The vehicle door handle assembly according to claim 9, wherein the cam holder comprises a cam lever extending along a longitudinal direction, said lever comprising a first end hinged on the rotation axis of the flap and a second end, opposite to the first, supporting the cam.

11. The vehicle door handle assembly according to claim 9, wherein the cam holder comprises a cam lever extending along a longitudinal direction, said lever comprising a first end hinged on the rotation axis of the flap and a second end, opposite to the first, supporting the cam and wherein the axis about which the cam holder is rotatable is a pin stemming from the first end of the cam lever configured to be inserted into a hole opened in the flap along the rotation axis, such that the cam lever is substantially parallel to a lateral side of the flap.

12. The vehicle door handle assembly according to claim 9, wherein the mechanical actuation switch comprises a flexible blade and wherein during rotation of the cam holder, a contact surface of the cam comes into contact with and pushes the flexible blade in at least one direction that is transverse to the rotation axis.

13. The vehicle door handle assembly according to claim 12, wherein the mechanical actuation switch comprises a push button and wherein during rotation of the cam holder, the flexible blade comes into contact with and pushes the push button, said pushing of the push button generating an electrical signal to be sent to a vehicle door controller to release the vehicle door.

* * * * *